United States Patent
Hasnedl et al.

(10) Patent No.: US 9,598,971 B2
(45) Date of Patent: Mar. 21, 2017

(54) ARRANGEMENT OF A SEGMENTED RETRACTABLE SEAL IN A STATOR OF A TURBINE

(71) Applicant: Doosan Skoda Power s.r.o., Plzen (CZ)

(72) Inventors: Dan Hasnedl, Plzen (CZ); Lubos Prchlik, Plzen (CZ)

(73) Assignee: DOOSAN SKODA POWER s.r.o., Plzen (CZ)

(*) Notice: Subject to any disclaimer, the term of this patent is extended or adjusted under 35 U.S.C. 154(b) by 477 days.

(21) Appl. No.: 14/282,700

(22) Filed: May 20, 2014

(65) Prior Publication Data

US 2014/0348644 A1 Nov. 27, 2014

(30) Foreign Application Priority Data

May 22, 2013 (CZ) .............................. PV 2013-380

(51) Int. Cl.
| | | |
|---|---|---|
| *F01D 11/12* | (2006.01) | |
| *F16J 15/44* | (2006.01) | |
| *F01D 11/00* | (2006.01) | |
| *F01D 11/02* | (2006.01) | |
| *F04D 29/10* | (2006.01) | |

(52) U.S. Cl.
CPC ............ *F01D 11/12* (2013.01); *F01D 11/001* (2013.01); *F01D 11/025* (2013.01); *F16J 15/442* (2013.01); *F04D 29/102* (2013.01)

(58) Field of Classification Search
CPC ...... F01D 11/12; F01D 11/001; F01D 11/025; F16J 15/442; F04D 29/102
USPC ....... 415/170.1, 171, 1, 173.1, 173.3, 173.5, 415/174.2, 174.5
See application file for complete search history.

(56) References Cited

U.S. PATENT DOCUMENTS

| | | | |
|---|---|---|---|
| 4,017,088 A | | 4/1977 | Lerjen |
| 6,139,018 A | * | 10/2000 | Cromer .................. F16J 15/442 277/301 |
| 6,250,641 B1 | | 6/2001 | Dinc et al. |
| 7,229,246 B2 | | 6/2007 | Ghasripoor et al. |
| 2003/0094762 A1 | | 5/2003 | Fuller |

(Continued)

FOREIGN PATENT DOCUMENTS

EP          2 048 366 A1     4/2009

OTHER PUBLICATIONS

Search Report dated Oct. 10, 2013 issued in corresponding CZ application No. PV 2013-380.

*Primary Examiner* — Hoang Nguyen
(74) *Attorney, Agent, or Firm* — Sughrue Mion, PLLC

(57) ABSTRACT

A segmented retractable seal is provided in a stator of a turbine by which a rotor seal is arranged radially and axially movably in a groove formed in the stator of the turbine and is connected with a mechanism which retracts it away from the rotor of the turbine in a radial direction. The groove formed in the stator of the turbine contains an outer partial groove formed on the inner surface of the stator and an inner partial groove formed in the body of the stator and connected with it, its width being smaller than or equal to that of the outer partial groove. A head of the seal is arranged in the inner partial groove, and a comb of the seal is arranged in the outer partial groove. The head of the seal and the comb of the seal are connected by a neck of the seal.

5 Claims, 3 Drawing Sheets

(56) References Cited

U.S. PATENT DOCUMENTS

| | | | |
|---|---|---|---|
| 2006/0133928 A1* | 6/2006 | Bracken | F01D 5/225 415/173.4 |
| 2010/0239415 A1* | 9/2010 | Turnquist | F01D 11/025 415/174.2 |
| 2012/0043728 A1* | 2/2012 | Zeng | F01D 11/001 277/412 |
| 2013/0058765 A1* | 3/2013 | Zheng | F01D 11/001 415/173.1 |

* cited by examiner

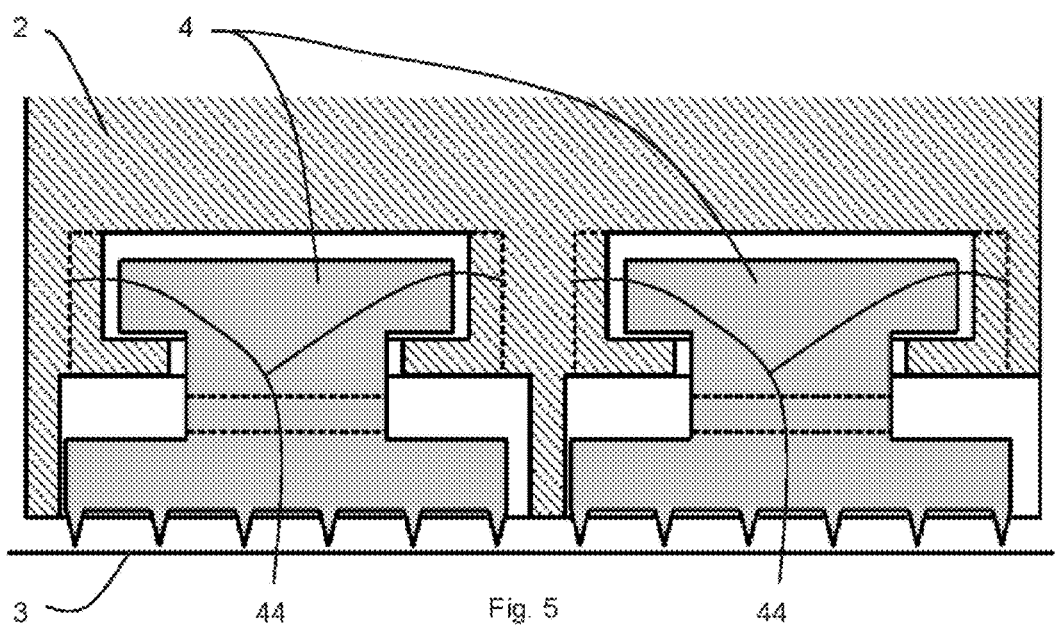

ARRANGEMENT OF A SEGMENTED RETRACTABLE SEAL IN A STATOR OF A TURBINE

TECHNICAL FIELD

The invention relates to an arrangement of a segmented retractable seal in a stator of a turbine, in which the seal is arranged radially and axially movably in a groove formed in the stator of the turbine and is connected with a means which retracts it away from the turbine rotor in radial direction.

BACKGROUND ART

For mutual sealing of pressurized and underpressure spaces of a turbine and for sealing them against atmospheric pressure numerous different types of rotor seals are currently used, as well as methods of their arrangement. In order to avoid mechanic damage of the turbine due to increasing vibrations when the turbine passes the critical speed of the rotor, for example during the start-up of the rotor—seals are always designed with the minimum posssible gap between the rotor and the stator—above all movable (retractable) rotor seals are used, whereby during the turbine start-up the movable (retractable) seals are distanced from the rotor and approach it only after passing the critical speed or after achieving operating speed of the turbine, while their movement is allowed by the fact that they are divided into several circumferential segments (generally from 4 to 8), wherein the movement of each of these segments is usually evoked either by a spring—see for example U.S. Pat. No. 7,229,246, or by pressure of sealed medium—see for example US 2003094762. The advantage of the latter is that these mechanisms are, as a rule, simple without a need of outside control or special maintenance. However, their disadavantage is the fact that the pressure of the sealed medium does not always create force necessary to overcome the force of retractring springs, weight of the rotor seal itself and friction forces in the duct, and thus to press the rotor seal to the operating position. This is caused mainly by the fact that the friction forces, which are relatively hard to predict, can moreover change in course of time, for instance as a result of sedimentation of impurities, and can even completely block the movement of the rotor seal. In pursuit of solving these negative effects, the construction of rotor seals generally becomes very demanding as to the mounting—see for example EP 2048366, where the rotor seal has large dimensions, while the width of its head exceeds the widthof its sealing comb, which complicates or totally disables utilization of several such rotor seals arranged in a row next to each other.

The goal of the invention is to propose construction and arrangement of a segmented retractable rotor seal, which would at least partially eliminate the drawbacks of the background art—would ensure reliable pressing of the rotor seal towards the rotor and at the same time enable to arrange required number of rotor seals next to each other.

PRINCIPLE OF THE INVENTION

The goal of the invention is achieved by an arrangement of segmented retractable rotor seal in a stator of a turbine, by which the rotor seal is arranged radially and axially movably in a groove formed in the stator of the turbineand is connected with means which retracts it away from the turbine rotor in a radial direction, whereby its principle consists in that the groove formed in the turbine stator comprises an outer partial groove formed on the inner surface of the stator and an inner partial groove connected with it and created in the stator body, the width of the inner partial groove being smaller than or equal to width of the outer partial groove, whereby the rotor seal comprises a seal head, which is arranged in the inner partial groove, and a seal comb, which is arranged in the outer partial groove, whereby the seal head and the seal comb are connected by a seal neck, and the smallest clearance along the entire height of the arrangement of the rotor seal is formed in the direction of movement of sealed medium between the downstream face of the rotor seal comb and the wall of the outer partial groove facing it, whereby the space in the direction of the movement of the sealed medium before the rotor seal and the space closed between the upper surface of the seal comb and the stator of the turbine on the opposite side of the rotor seal are connected by at least one connecting hole created in the neck of the seal and/or at least one hole/slit created in the stator of the turbine on each side of the inner partial groove and connected with it.

With this type of rotor seal arrangement it is ensured that at each time point sufficient presssing force for its required movement is created, beacuse thanks to creation of the sealing point between the downstream face of the seal comb and the wall of the stator, friction forces between the rotor seal and the stator decrease by approximately 50% and, simoultaneously, the pressing force, which presses the rotor seal to the operational position, increases 2 to 4 times. Therefore the movement of the rotor seal is as many as six times more reliable than in the case of arrangements that have been used so far.

In an advantageous embodiment of arrangement, resp. of the goove and the seal, the outer partial groove, the inner partial groove, the seal head and the seal comb are rectangular in cross section.

The movement of the rotor seal towards the rotor is limited by back stops, whereby in one of the versions these back stops can be equippedwith a step for lower surface of a protrusion formed on the lower side of the rotor seal head.

In another variant of embodiment the movement of the rotor seal towards the rotor is limited by protrusions on the lower surface of the rotor seal head and/or on the side of its neck.

DESCRIPTION OF THE DRAWINGS

In the enclosed drawings

EXAMPLES OF EMBODIMENT

Figure 1:
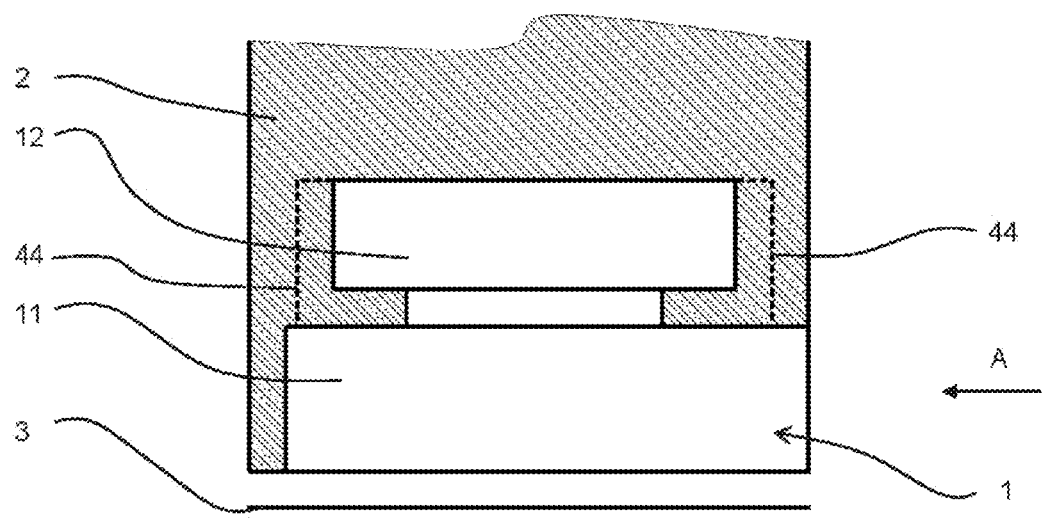
FIG. 1 schematically represents cross section of a groove for arrangement of segmented retractable rotor seal according to the invention, FIG. 2 cross section of an arrangement of segmented retractable rotor seal according to the invention in position when the seal is retracted away from the turbine rotor, FIG. 3 cross section of an arrangement of segmented retractable rotor seal according to the invention in position when the seal is pressed to the turbine rotor, FIG. 4 cross section of an arrangement of a segmented retractable rotor seal according to the invention in another embodiment of segmented retractable seal, namely its back stops, and FIG. 5 cross section of an arrangement of two segmented retractable rotor seals according to the invention arranged in a row next to each other.

The arrangement of segmented retractable rotor seal according to the invention is based, as well as in the case of the same types of rotor seals known from the prior art, on the fact that the seal is arranged in a groove formed in a stator of a turbine along the whole circumference of the stator. The groove 1—see FIG. 1, in the embodiment according to the invention consists of an outer partial groove 11 with rectangular cross section formed on the inner surface of the stator 2, the groove being opened in the direction away from the rotor 3 and in the direction of the flow of the sealed medium (arrow A), to which is connected inner partial groove 12 having rectangular cross section, which is formed in the stator body 2 and which is closed from all sides, with the exception of its connection with the outer partial groove 11. The width of the inner partial groove 12 is advantageously smaller than that of the outer partial groove 11, as can be seen in the represented version of embodiment, which enables using of several rotor seals 4 arranged in a way according to the invention in a row next to each other—see FIG. 5, or, as the case may be, both partial grooves 11, 12 have the same width.

Figure 2:
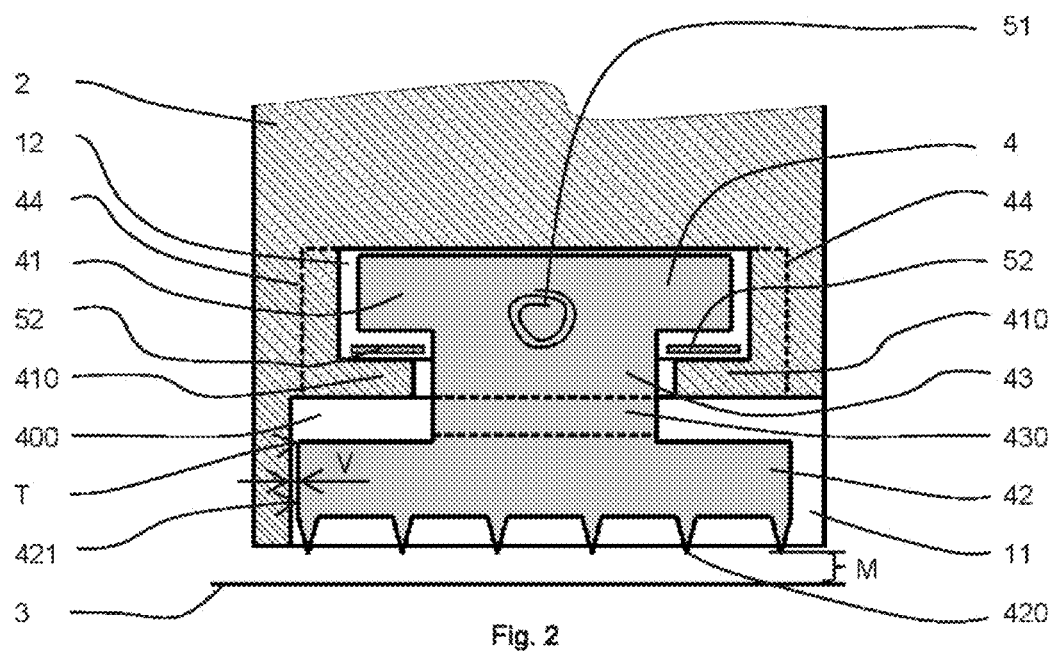
Figure 3:
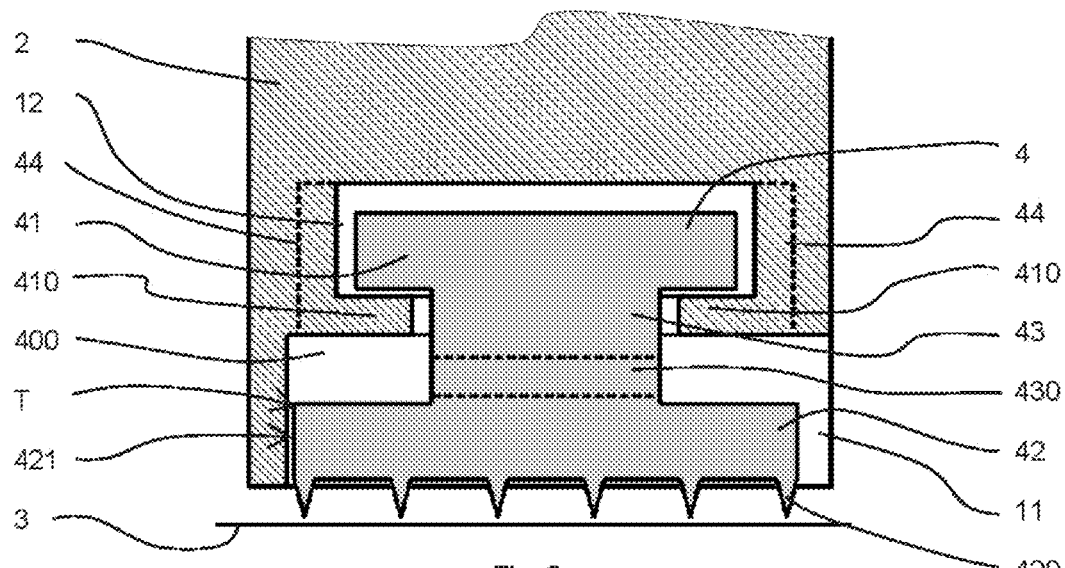
Figure 4:
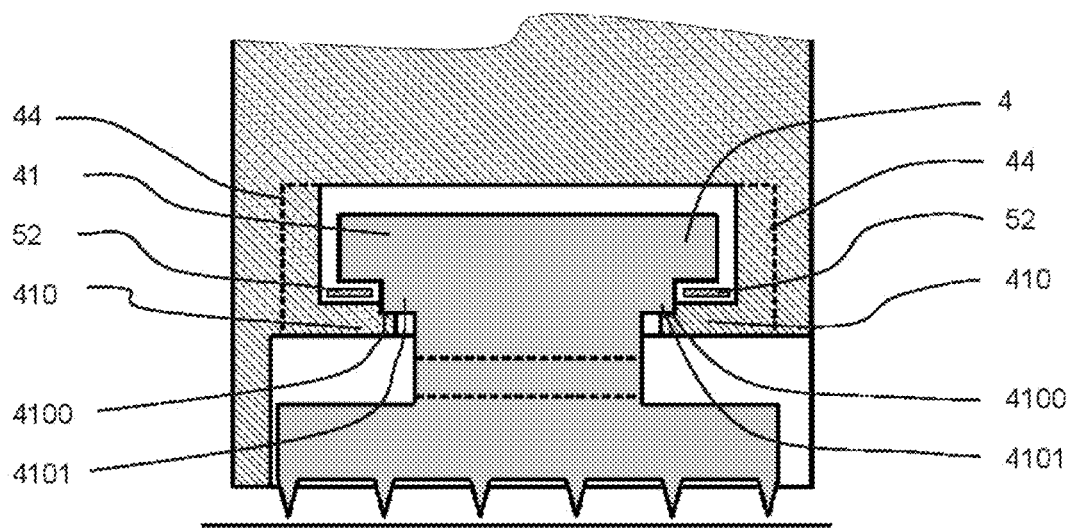

In the groove 1 is further arranged a rotor seal 4. In the illustrated example of embodiment (FIG. 2 to FIG. 4) there is segmented retractable rotor seal 4, which is in the cross section created as axially symmetrical—however, in another not-represented variant of embodiment it could be created also as axially asymmetrical—wherein it comprises a head 41 and a comb 42 connected by a neck 43. The head 41 of the seal 4, which has rectangular cross section is arranged in the inner partial groove 12, and its comb 42, equipped on at least part of its surface which faces towards the rotor 3 with at least one fin 420 and/or one not-represented sealing metal brush, is arranged in the outer partial groove 11. In an not-represented variant of embodiment, all fins are situated on the surface of the rotor 3, and the surface of the comb 42 facing it, is smooth. The widest portion of the rotor seal 4 in all the variants is the comb 42, whereby between the downstream (in the direction of the movement of the sealed liquid) face 421 of the comb 42 and the wall of the outer partial groove 11 facing it, there is at the same time formed the smallest clearance V along the entire height of the arrangement of the rotor seal 4 in the groove 1.

The rotor seal 4 is along its length, resp. along the circumference of the stator 2, divided into at least two segments, usually into 4 to 8 segments, possibly even more, each of them being connected and/or equipped with a coil spring 51 and/or a pair of leaf springs 52, or another well-known means which retract the seal 4 away from the rotor 3 of the turbine in radial direction. Thus between the surface of the rotor 3 and the tips of the fins 420 a gap M is created, when the turbine is out of operation or during start-up—see FIG. 2, which represents rest position of the rotor seal 4 arranged in a way according to the invention.

In the neck 43 of the rotor seal 2 at least one connecting hole 430 is created, preferably there are several connecting holes 430 arranged along its entire length, which connect the space before the rotor seal 4 and the space 400 closed between the upper surface of the comb 42 of the rotor seal 4 and the stator 2 of the turbine on the opposite side of the seal 2, thus enabling to achieve the same pressure in both these spaces. Due to this, after supplying the sealed medium and after reaching the operating pressure, this pressure acts on outer surfaces of the rotor seal 2 and, as a result of this, overdraw of coil spring 51 and/or pair of leaf springs 52, or another means and shifting the rotor seal 4 very closely to the rotor 3 follows—see FIG. 3, which represents the operating position of the rotor seal 4 arranged in a way according to the invention. After this shifting, the rotor seal 4 begins to seal in the standard manner. Its exact, or required distance from the rotor 3 is, moreover, secured by position of back stops 410, on which abuts its head 41. In the variation of embodiment represented in FIG. 4, the back stops 410 are equipped with a step 4100, on which abuts the lower surface of a protrusion 4101 on the lower surface of the head 41 of the rotor seal 4, and so after shifting the rotor seal 4 in the space between the lower surface of its head 41 and the back stops 410 remains sufficient space for the leaf springs 52 and, moreover, mutual contact, namely moulding the leaf springs 52 is prevented. In another non-represented variation of the rotor seal 4 are its segments for this purpose equipped with protrusions created on the lower surface of its head 41 or/and on the side of the neck 43.

During supply of the sealed medium, the rotor seal 4 moves by its action in an axial direction, whereby the downstream face 421 of its comb 42 is pressed towards the wall of the stator 2, therefore the clearance V at that particular moment equals 0, and in the place of their contact a sealing point T is created—in the represented embodiment it is in the place of the contact of the upper edge (i.e. the edge further from the rotor 3) of the comb 42 of the seal 4 with the wall of the stator 2. Also, in this place the material of the comb 42 of the seal 4 and/or the stator 2 is advantageously processed with higher precision and/or provided with anti-corrosive surface coating and/or provided with at least one non-represented protrusion and/or groove. The advantage of this construction and arrangement of the rotor seal 4 is the fact that at each time point it ensures that created pressing force is sufficient to overcome friction forces and push-off force of the coil spring 51 and/or of the pair of leaf springs 52, or, as the case may be, another well-known means, because due to the position of the sealing point T, which is in the seal according to the prior art located on the neck 43 of the seal 4, in comparison with these seals, the friction forces between the rotor seal 4 and the stator 2 decrease by approximately 50% and at the same time the pressing force increases and pushes the rotor seal 4 to the operating position, in accordance with the specific geometry of the rotor seal 4, from 2 up to 4 times. Consequently, the movement of the rotor seal 4 is substantially more reliable (up to 6 times) than in the case of the rotor seals known from the prior art. Furthermore, the arrangement of the segmented retractable rotor seal 4 according to the invention prevents the seal from undesirable rotation and from decreasing of its sealing properties.

In an alternate embodiment the space 400 closed between the upper surface of the comb 42 of the rotor seal 4 and the stator 2 of the turbine is connected with the space before the rotor seal 4 by at least one hole/slit 44 created in the stator 2 on each side of the inner partial groove 12 and connected with it, which is in FIGS. 1 to 5 of enclosed drawings indicated with dashed lines, but preferably by several such holes/slits 44 created along the entire circumference of the stator 2, or by combination of this/these holes/slits 44 with connecting hole 430/holes in the neck 43 of the rotor seal 4.

In various embodiments individual parts of the groove 1 and/or of the rotor seal 4 are susceptible to numerous changes and modifications, for example as to the shape of their cross section, the number and/or position and/or the size of fins 420 and/or of the sealing metal brushes and/or their inclination, etc. In order to maintain the required functionality and increased reliability an essential role is played by connection of the space 400 closed between the upper surface of the comb 42 of the rotor seal 4 and the stator 2 of the turbine with the space before the rotor seal 4 and creation of the sealing point in the place of contact of downstream face 421 of the comb 42 of the rotor seal 4 and the wall of the stator 2.

In non-represented variants of embodiment the rotor seal 4 can have a lightening, formed for instance by a radial circumferential groove/grooves created in the head 41 of the seal 4, and possibly further extending to its neck 43, etc.

LIST OF REFERENTIAL MARKS

1 groove
11 outer partial groove
12 inner partial groove
2 stator of turbine
3 rotor of turbine
4 rotor seal
400 space closed between the upper surface of the rotor seal comb and the stator of turbine
41 rotor seal head
410 back stop
4100 step on the back stop
4101 protrusion formed on the lower surface of the rotoro seal head
420 fin
421 downstream face of the rotor seal comb
43 neck of the rotor seal
430 connecting hole
44 hole/slit
51 coil spring
52 leaf spring
A direction of flow of sealed medium
M gap
T sealing point
V clearance

The invention claimed is:

1. An arrangement of segmented retractable rotor seal in a stator of a turbine, by which the rotor seal is arranged radially and axially movably in a groove formed in the stator of the turbine and is connected with a means which retracts it away from the rotor of the turbine in radial direction, wherein the groove formed in the stator of the turbine contains an outer partial groove formed on the inner surface of the stator and an inner partial groove connected with it and formed in the body of the stator, the width of the groove being smaller than or equal to that of the outer partial groove, whereby the rotor seal contains a head of the seal, which is arranged in the inner partial groove, and a comb of the seal, which is arranged in the outer partial groove, wherein the head of the seal and the comb of the seal are connected by a neck of the seal, and the smallest clearance (V) along the entire height of the arrangement of the rotor seal is formed in the direction of movement of sealed medium between the downstream face of the comb of the rotor seal and the wall of the outer partial groove facing it, whereby the space in the direction of the movement of sealed medium before the rotor seal and the space closed between the upper surface of the comb of the seal and the stator of the turbine on the opposite side of the rotor seal are connected by at least one connecting hole created in the neck of the seal and/or at least one hole/slit created in the stator of the turbine on each side of the inner partial groove and connected with it.

2. The arrangement according to the claim 1, wherein the outer partial groove, the inner partial groove, the seal head and the seal comb are rectangular in cross section.

3. The arrangement according to claim 1, wherein the movement of the rotor seal towards the rotor is defined by back stops.

4. The arrangement according to the claim 3, wherein the back stops are equipped with a step for the lower surface of the protrusion formed on the lower surface of the head of the rotor seal.

5. The arrangement according to the claim 1, wherein the movement of the rotor seal towards the rotor is defined by protrusions on the lower surface of the head of the rotor seal and/or on the side of its neck.

* * * * *